July 24, 1962     O. R. SEIBERT ET AL     3,045,265
TAPPING SPINDLE WITH YIELDABLE NUT RETAINING MEANS
Filed Nov. 5, 1959
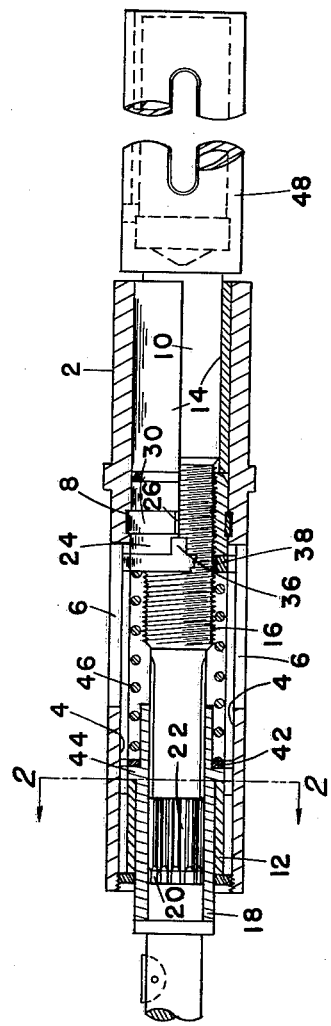
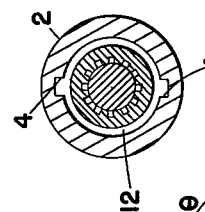
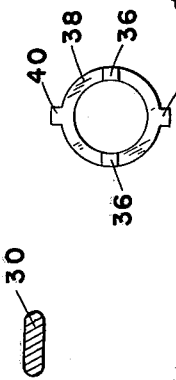
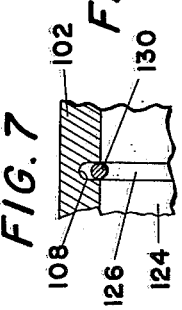
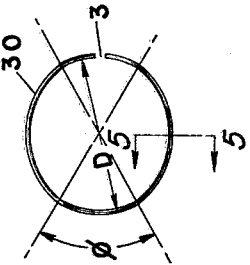
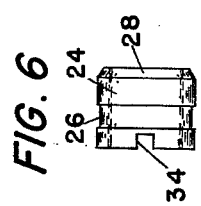
INVENTORS:
OTTO R. SEIBERT
WARREN F. SEIBERT
BY
John F. Schmidt United States Patent Office 3,045,265
Patented July 24, 1962

3,045,265
TAPPING SPINDLE WITH YIELDABLE NUT
RETAINING MEANS
Otto R. Seibert and Warren F. Seibert, Chenoa, Ill.
Filed Nov. 5, 1959, Ser. No. 851,040
4 Claims. (Cl. 10—135)

This invention relates to a tapping machine spindle, of a general type shown in Patents 1,681,289 and 2,165,396 issued to R. M. Galloway and J. H. Mansfield on August 21, 1928, and July 11, 1939, respectively.

In machines of this type, several tapping spindles are provided in order to tap a number of drilled holes simultaneously. In many uses of such machines, the pieces to be tapped are not identical—i.e., one piece may have ten holes to be tapped, the next piece may have only eight holes, the next seven, etc., such that one or more of the tapping spindles may strike solid metal at times. In that case, of course, something must give way or the machine tool will break.

In conventional tapping spindles, a spring is provided, to yield in case the spindle strikes solid metal instead of a drilled hole, and that same spring must also provide the required initial thrust to start the tap when the tap engages a hole. In such a structure, the spring provides its minimum thrust at the beginning of the tapping stroke. It is desirable that the maximum thrust be present at the start of the tapping stroke.

It is accordingly an object of this invention to provide a tapping spindle which permits the tap to yield when the tap encounters solid metal instead of a drilled hole, but which provides maximum thrust at the beginning of the tapping stroke instead of at the end of the stroke.

In the drawings:

FIG. 1 is a longitudinal sectional view of a tapping spindle embodying this invention. Some of the parts in this figure are shown partly in elevation (largely above the center line) and partly in section (below the center line);

FIG. 2 is a view in section on line 2—2 of FIG. 1;

FIG. 3 is an end view of a member (known as a "sliding retainer") which holds the lead screw nut against rotation relative to the outer sleeve;

FIG. 4 is a view of the unconfined spring ring which provides the necessary end thrust to start the tap in a drilled hole but which yields to permit the tap to yield in case the tap strikes solid metal. FIG. 4 is on a larger scale than FIG. 1;

FIG. 5 is a view in section of line 5—5 of FIG. 4 but on a larger scale;

FIG. 6 is a side elevation view of the lead screw nut, on substantially the same scale as FIG. 1;

FIG. 7 shows another embodiment of the ring spring, this figure corresponding to a portion of FIG. 1, but on a larger scale; and FIG. 8 is a view similar to FIG. 4, showing the spring of the embodiment illustrated in FIG. 7.

Referring now in detail to the drawings, an outer sleeve 2 is provided through approximately the left half of its length with a pair of diametrically opposed slots 4 in its inner surface. Slots 4 terminate in slots 6 which extend clear through the shell. To the right of slots 6, an annular groove 8 is provided in the inner surface of sleeve 2.

A lead screw spindle 10 is rotatable in the sleeve in bushings 12 and 14. Spindle 10 is threaded throughout a portion of its length as shown at 16. A drive sleeve 18 is internally splined as shown at 20, splines 20 engaging external splines 22 on spindle 10.

A lead screw nut 24 is disposed between sleeve 2 and spindle 10. Nut 24 is internally threaded to co-operate with threads 16 of spindle 10. Nut 24 is provided with an annular groove 26 in its outer surface and is chamfered at its right end (as seen in FIG. 11), as shown at 28.

In the position of the parts shown in FIG. 1, the assembly includes means engaging the sleeve and the nut, the means being yieldable to permit axial displacement of the nut relative to the sleeve. The means is a resilient annular member or ring 30. As can best be seen in FIG. 4, ring 30 is approximately elliptical in shape in its unconfined state, having a long axis (horizontal in FIG. 4) and a short axis (vertical in FIG. 4). Ring 30 can thus be said to have two lobes, these being at the ends of the long axis.

For practical purposes, ring 30 may consist of four circular arcs. Each of the shorter of these arcs extends over an angle $\phi$ which may vary between 60° and 70°, and has a radius which is centered at the geometric center of the ring. This radius is preferably equal to the radius of the groove in the sleeve. The wider arcs have a somewhat longer radius which, for the upper arc, is centered below the geometric center of the ring and for the lower arc is centered above said geometric center. The length of this radius, while not critical, should for best results be such that the distance from the geometric center of the ring to the closest portion of the spring is no greater than the radius of groove 26 in nut 24; moreover, this distance should preferably be the same for both of the wider arcs. Thus, a successful ring has been made having a dimension D between 1.257 inches and 1.267 inches, and each of the wider arcs having a radius of $1\frac{1}{16}$ inch.

Ring 30 is interrupted or discontinuous at one end of the long axis (i.e., in one of the lobes), as shown at 32. The peripheral length of the ring, for best results, should be less than the circumference of groove 26, so that the ends of the ring cannot come together in the assembly.

The groove 8 in the sleeve 2 is substantially deeper than groove 26 in nut 24, and is slightly deeper than the radial thickness of ring 30. Thus a successful assembly has been made in which groove 8 has a depth of .035 inch, groove 26 a depth of .020 inch, and ring 30 a radial thickness of .032 inch. As is best seen in FIG. 5, both edges of ring 30 are nicely rounded.

Lead screw nut 24 is provided with slots 34 at opposite ends of a diameter. The slots 34 receive tongues 36 on a sliding retainer 38 which, at opposite ends of a diameter, carries ears 40. The ears 40 extend radially outward into the slots 4 to hold retainer 38, and thus nut 24, against rotation relative to sleeve 2.

A washer 42 shaped much like retainer 38 (but having no tongues corresponding to tongues 36) is disposed adjacent a collar 44 on drive sleeve 18. Between the elements 42 and 38, there is disposed means for resiliently biasing nut 24 into the one axial position relative to sleeve 2 in which the spring ring 30 engages both the sleeve 2 and the nut 24. The means here shown is a coil spring 46.

Spindle 10 is provided at its right end (FIG. 1) with a coupling device, chuck, or the like, as shown at 48. As will be understood by those skilled in the art, the device 48 receives and holds a tool, such as a tap for threading drilled holes.

FIGS. 7 and 8 show another form which the invention may take. In many applications, it is desirable for the spring to have a substantially circular cross section as shown in FIG. 7, instead of flat as seen in FIG. 5. The grooves would also be circular in that case. Also, the embodiment shown in FIGS. 7 and 8 provides a spring having three lobes instead of the two lobes seen in FIG. 4.

The embodiment shown in FIGS. 7 and 8 carries reference characters 100 numbers higher than for corresponding elements in the embodiment of FIGS. 1–6. Thus ring spring 130 of FIGS. 7 and 8 corresponds to ring spring 30 of FIGS. 1–6. The ring 130 is received in grooves 108 and 126 in shell 102 and nut 124 respectively.

The three lobes of ring 130 are formed by three spaced arcs subtending angles $\phi'$, each of these arcs having a radius which is equal to the radius of groove 108 in sleeve 102 and is centered at the geometric center of the ring. These arcs are substantially equally spaced by arcs subtending angles $\theta$ and having radii longer than the three first-named arcs.

As in the two-lobe spring 30 (FIGS. 4), three-lobe spring 130 has arcs $\phi'$ which lie in the grooves 108, and arcs $\theta$ which, as to the portions closest to the ring center, lie in the groove 126 of nut 124 when the parts are in the position shown in FIG. 7. Note that ring 130 is interrupted or discontinuous in one of the lobes, as shown at 132.

Also, while the exact radius of arcs $\theta$ is not critical, it should be such that the portion of each arc nearest the ring center should be a distance from the center that is not greater than the radius of groove 126 in nut 124, and that distance should be substantially the same for all of the arcs $\theta$.

It may be pointed out that, while the curved portions $\theta$ are herein referred to as "arcs," it is not essential that these portions $\theta$ of FIG. 8 (and the corresponding portions of FIG. 4) be precisely circular. These curved portions can be formed by taking a ring which is initially substantially circular, and then deforming the portion $\theta$ beyond the elastic limit substantially along a straight line, after which the portion thus deformed springs back somewhat into a shape which, for all practical purposes, may be taken as the arc of a circle.

Operation

In operation, the spindle assembly is operated by rotating the spindle 10 so as to move the spindle 10 to the right because of threads 16 and the co-operating threads in nut 24. If the tap (not shown) engages a drilled hole, the endwise thrust provided by spring ring 30 engaging nut 24 and sleeve 2 (via the medium of grooves 26 and 8 respectively) is sufficient to get the tap started in its hole.

On the other hand, if the tap strikes solid metal, the resistance to movement to the right is great enough to overcome the end thrust, ring 30 expands outward into groove 8, and nut 24 is free to move leftward as seen in FIG. 1, compressing spring 46, since lead screw spindle 10 is unable to advance to the right. If the spindle 10 rotates long enough, nut 24 will withdraw completely from engagement with ring 30.

At the end of the working stroke, the direction of rotation of spindle 10 is reversed. The chamfered end of nut 24 engages spring 30 and forces the nut into the ring 30 until the ring again engages groove 26. Tongues 36 on retainer 38 are kept in the slots 34 by the force of spring 46, which also assists in returning nut 24 to the position shown in FIG. 1.

The operation of the embodiment shown in FIGS. 7 and 8 will be understood from the foregoing by those skilled in the art and need not be detailed here, except to note that, for many applications, the three-lobe spring of FIG. 8 centers itself more accurately in the two grooves.

It will be apparent from the foregoing that this invention provides a tapping machine spindle in which maximum thrust is provided at the moment of engagement, rather than at the end of the working stroke. Other advantages will be apparent to those skilled in the art.

While there are in this application specifically described a plurality of forms which the invention may assume in practice, it will be understood that these forms are shown for purposes of illustration and that the invention may be modified and embodied in various other forms without departing from its spirit or the scope of the appended claims.

What is claimed is:
1. A tapping machine spindle assembly comprising: an outer sleeve having an annular groove in its inner surface, a lead screw spindle in the sleeve and rotatable with respect thereto, a lead screw nut between the outer sleeve and the screw spindle and axially movable relative thereto, annular means engaging the groove and the nut in one axial position of the nut relative to the sleeve and yieldably expansible into the groove to permit axial displacement of the nut relative to the sleeve, and means resiliently biasing the nut into said one axial position.

2. A tapping machine spindle assembly comprising: an outer sleeve having an annular groove in its inner surface, a lead screw spindle in the sleeve and rotatable with respect thereto, a lead screw nut between the outer sleeve and the screw spindle which is axially movable with respect to the sleeve and which is provided with an annular groove in its outer surface, a ring engaging both grooves in one axial position of the nut relative to the sleeve and elastically expansible into the sleeve groove to permit axial displacement of the nut relative to the sleeve, means between the outer sleeve and the spindle in engagement with the sleeve and the nut to prevent rotation of the nut relative to the sleeve, and resilient means engaging the last-named means to bias the latter into constant engagement with the nut.

3. A tapping machine spindle assembly comprising: an outer sleeve having an annular groove in its inner surface, a lead screw spindle in the sleeve and rotatable with respect thereto, a lead screw nut between the outer sleeve and the screw spindle which is axially movable with respect to the sleeve and which is provided with an annular groove in its outer surface, a ring engaging both grooves in one axial position of the nut relative to the sleeve and elastically expansible into the sleeve groove to permit axial displacement of the nut relative to the sleeve, means between the outer sleeve and the spindle having a tongue and groove connection with the sleeve to permit relative axial movement while preventing relative rotation and having a connection with the nut to prevent relative rotation, and resilient means engaging the last-named means to bias the latter into constant engagement with the nut and being a helix disposed between the sleeve and the spindle.

4. A tapping machine spindle assembly comprising: an outer sleeve having an annular groove in its inner surface, a lead screw spindle in the sleeve and rotatable with respect thereto, a lead screw nut between the outer sleeve and the screw spindle which is axially movable with respect to the sleeve and which is provided with an annular groove in its outer surface, a ring engaging both grooves in one axial position of the nut relative to the sleeve and elastically expansible into the sleeve groove to permit axial displacement of the nut relative to the sleeve, means between the outer sleeve and the spindle having a tongue and groove connection with the sleeve to permit relative movement axially while preventing relative rotation and having a connection with the nut to prevent relative rotation, and a spring to bias the last-named means into said connection with the nut.

References Cited in the file of this patent

UNITED STATES PATENTS

| | | |
|---|---|---|
| 1,480,495 | Bessler | Jan. 8, 1924 |
| 1,741,093 | Briggs | Dec. 24, 1929 |
| 2,086,095 | Schafer | July 6, 1937 |
| 2,160,674 | Procunier | May 30, 1939 |
| 2,901,269 | Pickard | Aug. 25, 1959 |

FOREIGN PATENTS

| | | |
|---|---|---|
| 701,262 | Great Britain | Dec. 23, 1953 |